Figure 1:
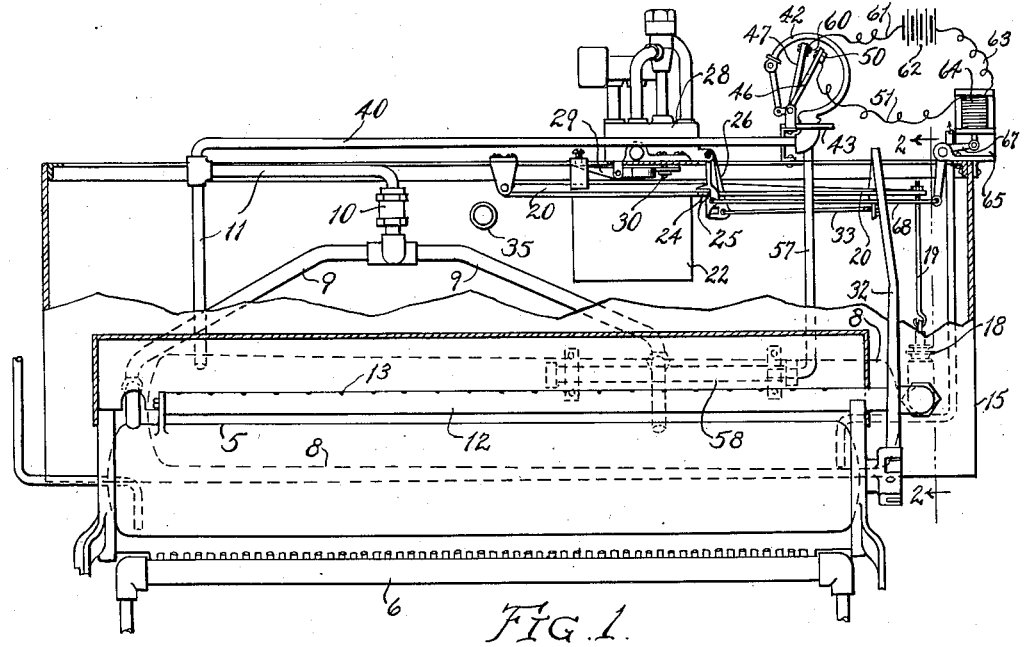

G. A. GASE.
CONTROLLING DEVICE FOR REFRIGERATING APPARATUS.
APPLICATION FILED SEPT. 3, 1914.

1,162,348.

Patented Nov. 30, 1915.

WITNESSES:
Gertrude K. Smith
Justin W. Macklin

INVENTOR
George A. Gase,
BY Albert H. Baker,
ATT'Y

UNITED STATES PATENT OFFICE.

GEORGE A. GASE, OF CLEVELAND, OHIO, ASSIGNOR, BY MESNE ASSIGNMENTS, TO THE ICELESS MACHINE COMPANY, OF CLEVELAND, OHIO, A CORPORATION OF OHIO.

CONTROLLING DEVICE FOR REFRIGERATING APPARATUS.

1,162,348. Specification of Letters Patent. Patented Nov. 30, 1915.

Application filed September 3, 1914. Serial No. 859,966.

*To all whom it may concern:*

Be it known that I, GEORGE A. GASE, a citizen of the United States, residing at Cleveland, in the county of Cuyahoga and State of Ohio, have invented a certain new and useful Improvement in Controlling Devices for Refrigerating Apparatus, of which the following is a full, clear, and exact description, reference being had to the accompanying drawings.

This invention relates to devices for controlling the supply of cooling and heating media in a refrigerating apparatus of the absorption type, such, for example, as is shown, described and claimed in the application of Harrison H. Southworth No. 837,118, filed May 8th, 1914. In such apparatus there is provided a generator-absorber and a condenser for the anhydrous ammonia driven off from the generator-absorber, the latter acting alternately as a generator and an absorber, being heated by fuel gas and cooled by water. The controlling device acts to change the operation of the apparatus from generation to absorption by shutting off the gas and turning on the water, and vice versa. It is dependent for its operation on conditions existing in the generator-absorber and in the condenser.

In the form I prefer to use, the change from generation to absorption, and vice versa, is effected by means of a thermostat in the generator-absorber and a pressure device connected with the condenser. The thermostat operates upon a predetermined degree of heat (which corresponds to a predetermined degree of weakness of solution) being reached in the generator and actuates the mechanism which shuts off the heat and starts the absorbing; and the pressure device operates by the diminution in condenser pressure which results from the liquid anhydrous ammonia being entirely exhausted and actuates mechanism which turns on the heat and stops the absorbing. As the temperature of the water used to cool the condenser varies with changes of seasons, being ordinarily much cooler in winter than in summer, and varies also with different localities, and as the temperature within the condenser becomes substantially commensurate with that of the cooling water, and as the pressure of the liquid anhydrous ammonia in the condenser varies in accordance with the temperature thereof, it follows that the machine will be operated at a much higher condenser pressure in summer or in southern localities than in winter or in northern localities.

Now, as it is the drop in condenser pressure which initiates the termination of the absorption period, it is obvious that the point of shifting must correspond to a lower pressure than that actually obtained in the condenser. Hence, if the machine were set with the shift occurring at a low enough pressure to operate in winter there would be an undesirably long delay in the summer time while the pressure dropped from the high summer rate to the releasing point; while, on the other hand, if the releasing point were high enough to be most efficient in summer it would be higher than the condenser pressure which could be reached in winter, and thus there would be no shifting operation.

As it is desirable to have the absorption period terminate quickly after the exhaustion of liquid refrigerant from the condenser, it has been the custom to manually adjust the pressure device for different localities and readjust it as the seasons vary, so that a comparatively small fall of pressure will result in effecting the shift desired. The present invention has been devised to avoid the necessity of this manual adjustment and re-adjustment, and it accomplishes this by providing a device coacting with the pressure device referred to and variable according to the temperature of the cooling water. This device accordingly insures the reversal taking place after the condenser pressure has dropped the desired amount, irrespective of what that condenser pressure was at the beginning of the drop, and, accordingly, it is unnecessary to make manual adjustments for different condenser pressures which are consequent upon the different temperatures of the cooling water.

A convenient apparatus for accomplishing the result referred to is shown in the accompanying drawings, described in the following specification and the essential characteristics are set forth in the claims.

Figure 2:
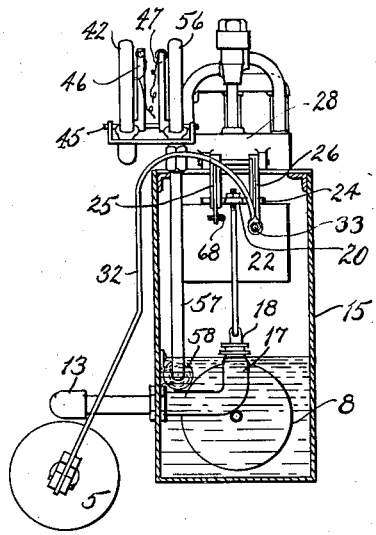
Figure 3:
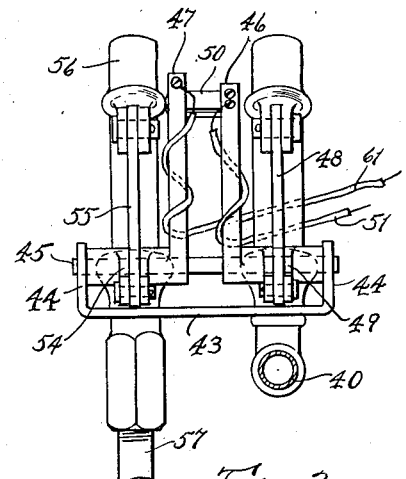

In the drawings, Figure 1 is a side elevation, partly in section, of a refrigerating apparatus such as shown and described in the application above referred to, showing my invention operatively connected therewith; Fig. 2 is a transverse vertical section through such device substantially on the line 2—2 of Fig. 1; Fig. 3 is a detail of the coöperating controlling devices, being a sectional elevation looking in the opposite direction to that of Fig. 2.

Referring to the drawings by reference numerals, 5 indicates the generator-absorber, 6 a burner pipe for fuel gas for heating the generator-absorber, and 8 indicates the condenser connected with the generator-absorber by pipes 9 leading upwardly therefrom through a suitable check valve 10 and a pipe 11. The generator-absorber is preferably cooled by a water pipe 12 mounted above the same and having suitable openings 13 through which water flowing from a tank 15 may escape, falling over the generator-absorber. The pipe 12 is connected with an upwardly turned elbow 17 within the tank 15 and adapted to be closed by a valve 18. This valve is adapted to be raised and lowered by a link 19 connected with the lever 20 pivoted to the top of the tank and operated by a float 22. The lever is adapted to be held in its raised and lowered position for the cooling and generation periods respectively by means of lateral projections 24 engaging latch hooks 25 and 26. When the lever is in its upper position a suitable valve mechanism 28 is closed by a small weighted lever 29 operating downwardly on a collar on the valve stem at 30 to shut off the supply of gas while the cooling water is flowing through the pipe 12, as described. A suitable thermostatic rod (not shown) within the generator-absorber, acts on a lever 32, extending over the edge of the tank and connected with a link 33. The end of this link is attached to the latch 26 and acts to operate the same, allowing the float 22 to move upwardly by its buoyancy in the water within the tank 15. This water, during the generation period, stands at a level, where it overflows through a suitable opening at 35, being supplied through the water regulated valve 28.

Connected with the pipe 11 is a pipe 40 leading to a Bourdon spring 42, to which it is so connected that the pressure variations within the condenser may act on the Bourdon spring, causing a bending and straightening of it. As shown, this Bourdon spring member is mounted on a suitable bracket 43 having upwardly turned ears 44 carrying a small shaft 45 on which are pivotally mounted two levers 46 and 47. The lever 46 is connected with the end of the Bourdon spring 42 by means of a link 48 pivotally connected to an arm 49 of this lever. The other arm of the lever 46 insulatingly carries an electric contact 50 connected with a wire 51. The lever 47 has an arm 54 pivotally connected with a link 55 attached at its upper end to the second Bourdon spring device 56, similar to the first, similarly mounted, and connected with a pipe 57 leading to a hermetically sealed tube 58. This tube is shown as mounted on the inside of the tank 15, where it is constantly immersed in the water within the tank 15. This tube 58, the pipe 57 and the Bourdon spring 56 have the air removed therefrom and are filled with ammonia gas or similar volatile fluid adapted to expand and contract in direct proportion to the temperature. Accordingly, the Bourdon spring 56 swings the arm 47 about its pivot, giving it a movement directly proportional to the temperature of the water. This arm 47 also insulatingly carries a contact point 60 connected with a suitable insulated wire 61 leading to a battery 62, which is connected by a wire 63 with a solenoid 64. The wire 51 leads to the other terminal of the solenoid, thus completing a circuit through the solenoid when the contacts 50 and 60 are brought together by a movement of the arms 46 and 47.

The solenoid is shown as mounted on a suitable bracket 65 and its core is pivotally connected with one arm of a bell crank 67 pivoted to the same bracket and having its other arm connected to a link 68 attached to the latch 25. Accordingly, as the pressure within the condenser falls to a predetermined point, the arm 47 will be swung to bring the contacts 50 and 60 together by the contraction of the Bourdon spring 42, closing the circuit through the solenoid and withdrawing the latch 25 by means of the connections described. This allows the float 22 and lever 20 to drop, closing the valve 18 and opening the gas valve 28, thus stopping the flow of water over the generator-absorber and resuming the heating of the same by an automatically controlled device for turning on the gas and relighting the burner. Such a gas controlling mechanism is shown and described in my application No. 837,118, filed May 8th, 1914.

It will be seen from the foregoing description that I obtain a very accurate regulation of the control of the cooling and heating media by providing a device having an intermediary operatable in direct relation to the temperature of the cooling water about the condenser, and providing an intermediary operated by a pressure device, connected with the condenser, operated in direct proportion to the pressure therein, these intermediaries being arranged to coöperate to cause a change in the operation of the refrigerating apparatus. As the changes in pressure in the condenser determine the time of operation of the mechanism causing the change of operation, and as this pressure is directly proportional to the temperature of the cooling water, any device which causes this operation in direct relation thereto greatly increases the efficiency of such a refrigerating apparatus. An apparatus so equipped is much more automatic than those heretofore used as it does not require adjusting for the various changes in seasons or other climatic conditions.

Having thus described my invention, what I claim is:

1. In an apparatus of the character described, the combination, with generating and absorbing means, a condenser and means for supplying cooling and heating media, of means for controlling the application of such supply to the refrigerating medium including a means variable in direct proportion to the temperature of the cooling medium.

2. The combination, with a refrigerating apparatus having generating and absorbing means and a condenser, of means for controlling the succession of alternate operations of such apparatus including coöperating intermediaries, one of said intermediaries being operated by conditions within the condenser and the other by conditions in the media surrounding the condenser.

3. In a device of the character described, the combination, with a generator-absorber, condenser and means for supplying cooling and heating media in a succession of alternate operations, an intermediary movable in direct proportion to the temperature of the cooling media, an intermediary operated by conditions within the condenser, and means causing a reversal of the operations consequent upon the intermediaries coming to positions at predetermined relations with each other.

4. In a device of the character described, the combination, with a generator-absorber, condenser and means for supplying cooling and heating media in a succession of alternate operations, of means for changing the operation by controlling the alternations including an intermediary movable in direct proportion to the temperature of the cooling media, an intermediary operated by the conditions within the condenser, and means causing the operation of said controlling means actuated by the two intermediaries coming together.

5. In a device of the character described, the combination, with a generator-absorber, condenser and means for supplying cooling media, means for supplying heating media, means controlling said supplying means to cause alternations of the same, a movable intermediary operated by the temperature of the cooling media, an intermediary operated by the pressure within the condenser, and means for operating the means controlling the alternations consequent upon the intermediaries coming to positions in a predetermined relation with each other.

6. In a device of the character described, the combination, with a generator-absorber, condenser and means for supplying cooling and heating media in a succession of alternate operations, latch mechanism controlling said means, of an intermediary operated by the temperature of the cooling media, an intermediary operated by the conditions in the condenser, electric contacts carried by said intermediaries, a source of current, and means operated thereby when said contacts are brought together to move said latch mechanism.

7. In a device of the character described, the combination, with a generator-absorber, condenser, means for supplying cooling and heating media in a succession of alternate operations, means controlling said supplying means causing the same to alternate, a movable device operated by the conditions in the condenser, a closed receptacle within the cooling media, a pressure device in communication therewith, an electric mechanism adapted to cause an operation of the alternating controlling means consequent upon a predetermined movement of said devices.

8. In a device of the character described, the combination, with a generator-absorber, condenser, means for supplying cooling and heating media in a succession of alternate operations, means causing the alternations including a movable member operated by the pressure in the condenser, a closed receptacle within the cooling media about the condenser, a pressure device in communication therewith, an electric mechanism having a circuit adapted to be affected to cause an operation of the means causing the alternations consequent upon a predetermined movement of said devices.

9. In a device of the character described, the combination, with a generator-absorber, condenser, means for supplying cooling media, controlling means for causing said supplying means to operate alternately including a pressure spring tube connected with the condenser, a second pressure spring tube, and a receptacle connected therewith and standing within the cooling media, electric contacts movable by said spring tubes, a source of current, and means for operating the controlling means consequent upon the contacts being brought together.

10. In a device of the character described, the combination, with a generator-absorber, condenser, means for supplying cooling media, controlling means for causing said supplying means to operate alternately including a pressure spring tube connected with the condenser, a second pressure spring tube, and a receptacle connected therewith and standing within the cooling media about the condenser, a pivoted arm connected with each spring tube, electric contacts carried by said arms, a source of current, connections between the contacts and the source of current, and means for operating the controlling means consequent upon the contacts being brought together.

11. In an absorption refrigeration apparatus, the combination, with a receptacle for liquid refrigerant and an absorber, of means for supplying a cooling medium to the absorber, means for terminating the absorption period dependent upon the exhaustion of liquid refrigerant from its receptacle, and automatically variable means for causing such termination to result when the condenser pressure has dropped a predetermined amount irrespective of what the pressure was at the start of the drop.

12. In an apparatus of the character described, the combination, with generating and absorbing means, a condenser and means for supplying cooling media, of means for controlling the application of such supply to the refrigerating medium including a means operated by a given amount of drop in the condenser pressure and irrespective of the degree of that pressure at the beginning of the drop.

13. In an absorption refrigeration apparatus, the combination with absorbing means and a receptacle for a liquid refrigerant, of a device adapted to be automatically set in approximate correspondence with the pressure in the receptacle before exhaustion of liquid refrigerant therefrom, a second device adapted to have a movement resulting from the dropping in such pressure consequent upon exhaustion of liquid refrigerant from said receptacle, and means conjointly controlled by both devices for terminating the absorption period.

14. In an apparatus of the character described, the combination, with generating and absorbing means, a condenser and means for supplying cooling and heating media in a succession of alternate operations, of means for causing the alternations of the operations including one device operating upon the exhaustion of liquid refrigerant and a coacting device automatically set to compensate for different temperatures of cooling water.

15. In an apparatus of the character described, the combination, with generating and absorbing means, of a condenser, means for supplying cooling medium thereto, means for controlling the application of such supply to the refrigerating medium including one device set corresponding to the temperature of the cooling medium, and another device having a movement resulting from the drop in pressure consequent upon exhaustion.

16. In an absorption refrigeration apparatus, the combination, with generating and absorbing means and a receptacle for liquid refrigerant, of means for supplying heat for generation and means for supplying a cooling medium for absorption, and means for terminating the absorption period dependent upon the exhaustion of liquid refrigerant from its receptacle but variable according to the temperature of the cooling medium.

17. In an absorption refrigeration apparatus, the combination, with absorbing means and a receptacle for liquid refrigerant, of means for supplying a cooling medium for the absorption, a device responsive to the pressure in said receptacle, a second automatically variable device, and means conjointly controlled by both devices for terminating the absorption period.

18. In an absorption refrigeration apparatus, the combination, with generating and absorbing means and a receptacle for liquid refrigerant, of means for supplying heat for generation and means for supplying a cooling medium for absorption, a fluid pressure device actuated by the reduction of pressure consequent upon the exhaustion of liquid refrigerant from its receptacle, a second device, a thermostat in the cooling medium for operating the second device, and means conjointly controlled by both devices for terminating an absorption period.

19. In an absorption refrigeration apparatus, the combination of a liquid refrigerant container, an absorber, means for supplying cooling medium thereto, a pressure responsive device in communication with said container, a thermostat in the cooling medium, and means for terminating an absorption period actuated conjointly by said pressure responsive device and said thermostat.

20. In an absorption refrigeration apparatus, the combination of a liquid refrigerant container, an absorber, means for supplying cooling medium thereto, a pressure responsive device in communication with said container, a second device approximately variable commensurately with the pressure obtained in the container preceding exhaustion of liquid refrigerant therefrom, and means for terminating an absorption period actuated conjointly by said devices.

21. In an absorption refrigeration apparatus, the combination, with generating and absorbing means and a receptacle for liquid refrigerant, of means for supplying heat for generation and means for supplying a cooling medium for absorption, a vessel located in the cooling medium and containing a thermostatic liquid, two Bourdon springs, one of which is in communication with said receptacle and the other with said vessel, and means for terminating an absorption period and starting a generation period consequent upon the conjoint operation of both Bourdon springs.

In testimony whereof, I hereunto affix my signature in the presence of two witnesses.

GEORGE A. GASE.

Witnesses:
 JUSTIN W. MACKLIN,
 ARCHER W. RICHARDS.